US008795749B2

(12) United States Patent
Benjamin et al.

(10) Patent No.: US 8,795,749 B2
(45) Date of Patent: Aug. 5, 2014

(54) PROCESS FOR PREPARING A HEAT PROCESSED BLEND FROM TWO OR MORE FRESH PLANT MATERIALS

(75) Inventors: Mia Claire Benjamin, Vlaardingen (NL); Jadwiga Malgorzata Bialek, Vlaardingen (NL); Daniel Anthony Jarvis, Vlaardingen (NL); Hendrikus Theodorus W M van der Hijden, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 31 days.

(21) Appl. No.: 13/635,912

(22) PCT Filed: Mar. 8, 2011

(86) PCT No.: PCT/EP2011/053433
§ 371 (c)(1),
(2), (4) Date: Nov. 6, 2012

(87) PCT Pub. No.: WO2011/117065
PCT Pub. Date: Sep. 29, 2011

(65) Prior Publication Data
US 2013/0064942 A1 Mar. 14, 2013

(30) Foreign Application Priority Data

Mar. 26, 2010 (EP) .................................. 10157877

(51) Int. Cl.
A23B 7/05 (2006.01)
(52) U.S. Cl.
USPC ........... 426/241; 426/244; 426/311; 426/589; 426/599; 426/510; 426/518; 426/519; 426/521; 426/73
(58) Field of Classification Search
CPC ........ A23B 7/005; A23B 7/0053; A23B 7/01; A23B 7/06; A23B 7/10; A23L 1/0255; A23L 1/2128; A23L 3/01
USPC .......... 426/72–73, 241–244, 247, 330.5, 333, 426/335, 589, 598–599, 510–511, 518–521, 426/311
See application file for complete search history.

(56) References Cited

U.S. PATENT DOCUMENTS

| 2,086,539 A * | 7/1937 | De Bethune ................... 426/518 |
| 2,474,649 A * | 6/1949 | Clarence ....................... 426/234 |
| 2,582,396 A * | 1/1952 | Rooker .......................... 426/639 |
| 2,912,330 A * | 11/1959 | Hawk Le et al. .............. 426/233 |
| 3,007,800 A * | 11/1961 | Kimbrough et al. .......... 426/102 |
| 4,011,348 A * | 3/1977 | Farrier et al. .................. 426/268 |
| 4,139,647 A * | 2/1979 | Douglas ........................ 426/482 |
| 5,248,515 A * | 9/1993 | Payton et al. ................. 426/599 |
| 5,595,775 A * | 1/1997 | Tishel ........................... 426/241 |
| 5,645,879 A * | 7/1997 | Bourne ......................... 426/321 |
| 5,723,166 A * | 3/1998 | Theuer et al. ................. 426/615 |
| 5,922,374 A * | 7/1999 | Daury et al. .................... 426/51 |
| 5,955,138 A * | 9/1999 | Theuer et al. ................. 426/615 |
| 6,051,235 A * | 4/2000 | Theuer ........................... 424/756 |
| 6,833,148 B1 * | 12/2004 | Yamamoto et al. ........... 426/321 |
| 2001/0026833 A1 | 10/2001 | Moreau et al. |
| 2002/0160094 A1 * | 10/2002 | Belmar et al. ................ 426/573 |
| 2004/0234659 A1 * | 11/2004 | Linton .......................... 426/509 |
| 2007/0054010 A1 * | 3/2007 | Kalum et al. ................... 426/51 |
| 2007/0122509 A1 | 5/2007 | Chomczynski |
| 2010/0047429 A1 * | 2/2010 | Bell et al. ...................... 426/615 |
| 2010/0136168 A1 * | 6/2010 | McHaney et al. .............. 426/52 |
| 2012/0064202 A1 * | 3/2012 | Kloepping et al. ........... 426/231 |

FOREIGN PATENT DOCUMENTS

| JP | 2006333720 | 12/2006 |
| WO | WO2007039452 A1 | 4/2007 |

OTHER PUBLICATIONS

Al Mey Chuah et al, Jan. 11, 2008, Effect of cooking on the antioxidant properties of coloured peppers, Food Chemistry, 111 No. 1, 20-28.
Andrea Bunea et al, Feb. 1, 2008, Total and individual carotenoids and phenolic acids content in fresh, refrigerated and processed spinach, Food Chemistry, 108 No. 2, 649-656.
Damon et al, Jan. 5, 2005, Phylloquinone (vitamin K1) content of vegetables, Journal Food Composition and Analysis, 18 No. 8, 751-758.
Emilia Leskova, Jan. 6, 2006, Vitamin losses: Retention during heat treatment and continual changes expressd by mathematical models, Journal of Food Composition and Analysis, 19 No. 4, 252-276.

(Continued)

Primary Examiner — Drew Becker
(74) Attorney, Agent, or Firm — Ellen Plotkin

(57) ABSTRACT

The present invention relates to a method of preparing a processed blend from two or more fresh plant materials, including a first fresh plant material containing lipophilic vitamin and a second fresh plant material containing hydrophilic vitamin; said process comprising: A. a first pre-treatment regime comprising: •providing pieces of the first fresh plant material; •cooking said pieces; comminuting the cooked pieces to produce a lipophilic vitamin containing puree; and said first pre-treatment regime additionally comprising the addition of oil; B. a second pre-treatment regime comprising: •providing pieces of the second fresh plant material; and •blanching said pieces to produce a hydrophilic vitamin containing mass; C. combining the lipophilic vitamin containing puree and the hydrophilic vitamin containing mass; wherein the lipophilic vitamin containing puree is homogenised at a high pressure before or after being combined with the hydrophilic vitamin containing mass. The process of the present invention offers the advantage that content as well as oral bioavailability of lipophilic and hydrophilic vitamins contained in the blend of plant materials are maximized.

11 Claims, No Drawings

(56) References Cited

OTHER PUBLICATIONS

Graziani et al, 2003, Effect of peeling and heating on carotenoid content and antioxidant activity of tomato and tomato-virgin olive oil systems, European Food Research and Technology, 216 No. 2, 116-121.

Kidmose, 2007, Effect of home preparation practices on the content of provitamin A carotenoids in coloured sweet potato varieties (*Ipomoea batatas* Lam) from Kenya, Innovative Food Science and Emerging Technologies, 8, pp. 399-406.

Miglio et al., 2008, Effects of Different Cooking Methods on Nutritional and Physicochemical Characteristics of Selected Vegetables, J. Agric. Food Chem., vol. 56, pp. 139-147.

Parada et al., 2007, Food Microstructure Affects the Bioavailability of Several NUtrients, Journal of Food Science, vol. 72 No. 2, pp. R21-R32.

Perez-Conesa, 2009, Changes in bioactive compounds and antioxidant activity during homogenization and thermal processing of tomato puree, Innovative Food Science and Emerging Technologies, vol. 10, pp. 179-188.

Picouet et al., 2009, Minimal Processing of a Granny Smith apple puree by microwave heating, Innovative Food Science and Emerging Technologies, 10, pp. 545-550.

Seybold et al, Nov. 17, 2004, Changes in Contents of Carotenoids and Vitamin E During Tomato Processing, J Agric Food Chem, 52 No. 23, 7005-7010.

\* cited by examiner

PROCESS FOR PREPARING A HEAT PROCESSED BLEND FROM TWO OR MORE FRESH PLANT MATERIALS

TECHNICAL FIELD OF THE INVENTION

The present invention relates to a process for preparing a heat processed blend from two or more fresh plant materials, notably plant materials such as fruit or vegetables. The process of the present invention is designed in such a way that content as well as oral bioavailability of lipophilic and hydrophilic vitamins contained in the blend of plant materials are maximised.

BACKGROUND OF THE INVENTION

It is well-known that fruit and vegetables are an important source of micronutrients such as vitamins and minerals. Heat processing of vegetables or fruit, as is commonly applied in the food industry, can have a pronounced impact on the levels of these vitamins in the final product as well as on their oral bioavailability. Here the term "oral bioavailability" refers to the fraction of the total amount of an ingested vitamin that ultimately reaches the systemic circulation. Thus, an oral bioavailability of 20% means that only 20% of the ingested amount of vitamin reaches the systemic circulation.

Processing of plant materials, including heat processing, can cause a reduction in vitamin content as a result of e.g. enzymatic or heat-induced degradation. Vitamin C and folates (vitamin B11) are examples of nutritionally important hydrophilic vitamins that are sensitive to enzymatic and heat-induced oxidative degradation. Heat processing of plant materials can also adversely affect the content of hydrophilic vitamins if such heat processing utilizes large quantities of water and if this water is discarded together with the dissolved vitamins contained therein.

Heat processing can also have a favorable impact on vitamin content, as it can be used to inactivate endogenous vitamin-degrading enzymes that become active when plant materials are cut or ground. In addition, heat processing can have a positive effect on the oral bioavailability of especially lipophilic (pro)vitamins, such as β-carotene. It has been shown, for instance, that oral bioavailability of some vitamins in heat processed fruit or vegetables is substantially higher than in the fresh fruit or vegetables.

The oral bioavailability of a vitamin that is contained within a fruit or vegetable is determined by three successive processes. First the vitamin must be released from the vegetable or fruit matrix into the juices of the gastrointestinal tract. The extent to which a vitamin is released from a vegetable or fruit into the gastrointestinal tract determines its so called bioaccessibility. In the case of hydrophobic compounds, partitioning into dietary mixed micelles is required for effective absorption. Secondly, the released nutrient must be transported across the intestinal epithelium into the portal vein and/or it must be transported in chylomicrons via the lymph into the bloodstream before it enters the heart (absorption). Finally, in order to reach the systemic circulation the vitamin that has been transported into the portal vein must pass the liver without being metabolized. Consequently, oral bioavailability of a vitamin is determined by its bioaccessibility, its absorption and its metabolization.

In the case of vegetables and fruit, limited bioavailability of lipophilic vitamins is mainly associated with limited bioaccessibility and/or limited absorption.

Heat processing of blends of different types of fresh fruit or fresh vegetables offers a special challenge, especially if these blends are composed of fruit/vegetables containing heat-sensitive vitamins as well as fruit/vegetables containing vitamins whose oral bioavailability is low. In general, it is impossible to find heating conditions that minimize degradation of heat-sensitive vitamins whilst at the same time maximizing the oral bioavailability of the vitamins contained within the blend. Hence, there is a need for a procedure for heat processing blends of fresh fruit or vegetables that maximizes the content as well as oral bioavailability of different vitamins, notably lipophilic as well as hydrophilic vitamins.

Miglio et al. (*Effects of Different Cooking Methods on Nutritional and Physicochemical Characteristics of Selected Vegetables*, J. Agric. Food Chem. (2008) 56, 139-147) describe the results of a study that investigated the effect of three common cooking practices (boiling, steaming and frying) on phytochemical contents (polyphenols, carotenoids, glucosinolates, and ascorbic acid). The authors state that an overall increase of Trolox equivalent antioxidant capacity (TEAC), ferric reducing antioxidant powder (FRAP) and total radical-trapping antioxidant parameter (TRAP) was observed in all cooked vegetables, probably because of matrix softening and increased extractability of compounds., which could be partially converted into more antioxidant chemical species. In addition, the authors conclude that their finding defy the notion that processed vegetables offer lower nutritional quality and also suggest that for each vegetable method a cooking method would be preferred to preserve the nutritional and physicochemical qualities.

Parada et al. (*Food Microstructure Affects the Bioavailability of Several Nutrients*, J. of Food Sc. (2007) 72(2), 21-32) provide a review summarizing relevant in vivo and in vitro methods used to assess the bioavailability of some nutrients (mostly phhytochemicals), types of microstructural changes imparted by processing and during food ingestion that are relevant in matrix-nutrient interactions, and their effect on bioavailability of selected nutrients.

SUMMARY OF THE INVENTION

The inventors have designed a process for heat processing blends of fresh plant materials that meets the aforementioned need. The inventors have designed a process in which plant materials that are rich in specific lipophilic vitamins are subjected to a combined heat and processing procedure that is designed to increase the oral bioavailability of these vitamins and in which plant materials that are rich in particular heat-sensitive hydrophilic vitamins are subjected to a different heat processing procedure that increases their oral bioavailability whilst at the same time minimizing heat-induced degradation.

More specifically, the inventors have developed a process for preparing a processed blend from two or more fresh plant materials, including a first fresh plant material containing a lipophilic vitamin selected from provitamin A, vitamin E, vitamin K and combinations thereof and a second fresh plant material containing a hydrophilic vitamin selected from vitamin B5, vitamin B6, vitamin B11, vitamin C and combinations thereof; said process comprising:

A. a first pre-treatment regime for increasing the bioavailability of the lipophilic vitamin contained in the first plant material, comprising:
  providing pieces of the first fresh plant material;
  cooking said pieces;
  comminuting the cooked pieces to produce a lipophilic vitamin containing puree; and said first pre-treatment regime additionally comprising the addition of oil;

B. a second pre-treatment regime for stabilising the hydrophilic vitamins contained in the second plant material comprising:
   providing pieces of the second fresh plant material; and
   blanching said pieces to produce a hydrophilic vitamin containing mass;
C. combining the lipophilic vitamin containing puree and the hydrophilic vitamin containing mass;
   wherein the lipophilic vitamin containing puree is homogenised at a high pressure before or after being combined with the hydrophilic vitamin containing mass.

The present process offers the advantage that it yields a blend of heat processed plant materials in which the oral bioavailability of lipophilic vitamins as well as the content of hydrophilic vitamins have been maximized. Although the inventors do not wish to be bound by theory, it is believed that the pre-treatment regime of the first fresh plant material is very effective in rendering lipophilic vitamins bioavailable by causing these vitamins to be released into the added oil to facilitate uptake in mixed dietary micelles in the gut. In order to maximize absorption of lipophilic vitamins into the oil and also to maximize oral bioavailability, the lipophilic vitamin containing puree is homogenized at a high pressure (>50 bar) before or after it is combined with the hydrophilic vitamin containing mass. This processing regime preserves lipophilic vitamins and at the same time greatly enhances their bioaccessability and intestinal absorption.

The pretreatment regime of the second fresh plant material aims to inactivate endogenous enzymes in the plant material with minimum heat exposure. Endogenous enzymes, such as ascorbate oxidase and peroxidase, once activated by e.g. cutting or grinding, can cause rapid degradation of hydrophilic vitamins such as vitamin C and vitamin B11. Since these hydrophilic vitamins tend to be heat-sensitive, heat inactivation of the endogenous enzymes should be conducted in a carefully controlled manner that minimizes heat-induced degradation of hydrophilic vitamins. Blanching was found to be perfectly suited for achieving this.

DETAILED DESCRIPTION OF THE INVENTION

Accordingly, one aspect of the invention relates to a process for preparing a processed blend from two or more fresh plant materials, including:
1) a first fresh plant material containing at least 5 mg/kg of lipophilic vitamin selected from provitamin A, vitamin E, vitamin K and combinations thereof; and
2) a second fresh plant material containing hydrophilic vitamin selected from at least 1 mg/kg of vitamin B5, at least 1 mg/kg of vitamin B6, at least 200 µg/kg of vitamin B11, at least 100 mg/kg of vitamin C and combinations thereof;
said process comprising:
A. a first pre-treatment regime for increasing the bioavailability of the lipophilic vitamin contained in the first plant material, comprising:
   providing pieces of the first fresh plant material;
   cooking said pieces by heating them to reach an internal temperature of at least 80° C. for at least 2 minutes;
   comminuting the cooked pieces to produce a lipophilic vitamin containing puree; and said first pre-treatment regime comprising the addition of 1-50% of oil by weight of the first plant material; and
B. a second pre-treatment regime for stabilising the hydrophilic vitamins contained in the second plant material comprising:
   providing pieces of the second fresh plant material; and
   blanching said pieces by heating them for 1-300 seconds to reach an internal temperature of at least 60° C. to produce a hydrophilic vitamin containing mass;
C. combining the lipophilic vitamin containing puree and the hydrophilic vitamin containing mass;
   wherein the lipophilic vitamin containing puree is homogenised at a high pressure of at least 50 bar before or after being combined with the hydrophilic vitamin containing mass.

Unless indicated otherwise, the term "bioavailability" as used herein should be construed as "oral bioavailability".

The term "plant material" as used herein refers to an edible plant or an edible part of a plant. Examples of plants from which the present plant material can be derived include fruit, vegetables, herbs and spices.

The term "fresh plant material" as used herein refers to a plant material that after harvesting has not been preserved by drying or retorting. The term "fresh plant material" does encompass plant material that has been preserved by freezing.

The term "cooking" as used herein refers to the heating of pieces of plant material in order to substantially soften the cell structure within these pieces. Thus, the cooked pieces of plant material are considerably softer than the original uncooked pieces. Typically, the firmness of the pieces of first fresh plant material is reduced by at least 40% as a result of cooking. Even more preferably, said firmness is reduced by at least 70%, most preferably by at least 80%.

The firmness of the pieces of plant material is suitably determined at ambient temperature in a compression test, using an SMS TA-XT plus Texture Analyser. In this compression test small cylindrical samples are cut from the pieces of plant material (diameter and length in the range of 5-10 mm). Next, the samples are compressed along the axis of the cylinder at a speed of 40 mm/sec (this high speed is comparable to compression speeds in the mouth). The measured force as a function of deformation increases to a maximum, at which point the sample breaks down and the force decreases. The maximum force is converted to a stress and this value is taken as a measure of firmness. This method of measuring firmness is well-known and widely described in the scientific literature.

The term "blanching" as used herein refers to the heating of pieces of plant material that is sufficient to largely inactivate the endogenous enzymes contained therein, notably the endogenous enzymes that can cause degradation of vitamins, but that does not cause a substantial softening of the cell structure within these pieces. Typically, the firmness of the pieces of the second fresh plant material is reduced by less than 50%, more preferably by less than 20% and most preferably by less than 10% as a result of blanching.

The terminology "internal temperature" as used herein refers to the temperature that is reached within the core of the vegetable pieces during the cooking or the blanching. The recited minimum internal temperature relates to the lowest maximum temperature that is reached within said vegetable pieces during the cooking or the blanching.

The term "comminuting" as used herein refers to the reduction of a plant material to small particles. Such a reduction to small particles may be achieved by techniques well known in the art, e.g. by cutting, grinding or milling.

The term "oil" as used herein refers to a lipid selected from the group consisting of triglycerides, diglycerides, monoglycerides, phospholipids and combinations thereof. The "oil" employed in accordance with the present invention can be liquid, solid or semi-solid at ambient temperature.

The benefits of the present process are particularly evident if the first fresh plant material contains at least 5 mg/kg of provitamin A and/or at least 2 mg/kg of vitamin E and/or at least 1 mg/kg of vitamin K; and if the second fresh plant material contains at least 1.5 mg/kg of vitamin B5 and/or at least 1.5 mg/kg of vitamin B6 and/or at least 300 µg/kg of vitamin B11 and/or at least 150 mg/kg of vitamin C. Most preferably, the first fresh plant material contains at least 10 mg/kg of provitamin A and the second fresh plant material contains at least 200 mg/kg of vitamin C.

In the first pre-treatment regime, the cooking of the pieces of the first plant material may suitably comprise heating these pieces in hot water, e.g. water having a temperature of at least 90° C. Even more preferably, said cooking comprises heating the pieces in boiling water. Typically, the amount of water employed in the cooking of the pieces of the first plant material exceeds 30%, more preferably at least 50% by weight of the first plant material.

In accordance with a preferred embodiment of the present process, the blanching of the pieces of the second plant material comprises microwave heating, contacting with steam, ohmic heating and/or contacting with hot water, said blanching, if employing addition of water, comprising addition of water in an amount of not more than 50%, more preferably not more than 30% by weight of the second plant material. The use of not more than a limited amount of water offers the advantage that the loss of hydrophilic vitamins can be minimized.

Advantageously, the heating of the pieces of the second plant material comprises microwave heating and/or contacting with steam. These heating techniques offer the advantage that they are very effective in achieving a high temperature throughout the pieces of plant material within a short time period, thereby minimizing unnecessary heat exposure. Furthermore, these heating techniques require little water, meaning that extraction losses of hydrophilic vitamins are minimal.

The pieces of the first fresh plant material that are cooked in step A. of the present process preferably have a mass weighted average diameter of at least 5 mm. The comminuted cooked pieces preferably have a substantially smaller diameter, e.g. a mass weighted average diameter of less than 500 µm. Comminution of the cooked pieces yields a puree from which the lipophilic vitamins can easily be extracted into the added oil. As explained herein before, the extraction of the lipophilic vitamins into the oil is further facilitated by the homogenisation of the lipophilic vitamin containing puree.

In another preferred embodiment, the second pre-treatment regime comprises comminuting the blanched pieces of the second plant material. Prior to comminuting, the pieces of the second fresh plant material typically have a mass weighted average diameter of at least 10 mm. After comminuting, the comminuted blanched pieces preferably have a mass weighted average diameter of less than 500 µm. Comminution of the blanched pieces increases the oral bioavailability of the vitamins contained therein.

The second pre-treatment regime advantageously comprises adding an acid aqueous component prior to the comminuting of the blanched pieces of the second plant material, said addition yielding a pH within the range of 3.5-5.5. The pH reduction so achieved is beneficial as it helps to prevent unwanted degradation of hydrophilic vitamins as a result of e.g. oxidation. An example of an acid aqueous component that may suitably be employed is citrus juice, e.g. lemon juice.

The cooking of the pieces of the first fresh plant material is typically achieved by using rather severe heating conditions. Typically, the cooking of the pieces of the first fresh plant material comprises heating said pieces to a temperature $T_1$ (in ° C.) during a period $t_1$ (in seconds) in accordance with the following equation: $6*10^4*(T_1-75)^{-3} \leq t_1 \leq 5*10^7*(T_1-70)^{-3}$; wherein $T_1$ is in the range of 80-150° C.

The blanching of the pieces of the second fresh plant material is preferably realized by employing heating conditions that are substantially less severe than those employed in the cooking of the first fresh plant material. Typically, said blanching comprises heating said pieces to a temperature $T_2$ (in ° C.) during a period $t_2$ (in seconds) in accordance with the following equation: $3*10^4*(T_2-55)^{-3} \leq t_2 \leq 3*10^5*(T_2-60)^{-3}$; wherein $T_2$ is in the range of 70-105° C.

In the present process, the lipophilic vitamin containing puree is homogenised at a high pressure of at least 50 bar, preferably of at least 100 bar, even more preferably of at least 200 bar, before or after being combined with the hydrophilic vitamin containing mass. The homogenisation facilitates the release of the lipophilic vitamins into the oil and increases the oral bioavailability of these vitamins.

The homogenisation typically produces a homogenized product containing a dispersed oil phase having a volume weighted average diameter of less than 12 µm. More preferably, said homogenisation yields a homogenized product comprising a dispersed oil phase having a volume weighted average diameter of 1-7 µm The homogenisation typically reduces the volume weighted average particle size of the vegetable particles contained therein to less than 400 µm. Preferably, the volume weighted average particle size of the vegetable particles in the homogenised product lies within the range of 100-300 µm, even more preferably within the range of 100-200 µm.

In the present process, the lipophilic vitamin containing puree and the hydrophilic vitamin containing mass are suitably combined in a weight ratio that lies within the range of 1:10 to 10:1, more preferably within the range of 1:3 to 3:1.

The processed blend that is obtained in the present process typically has a water content of 75-95 wt. %. The bulk of the dry matter contained in the processed blend is preferably derived from heat processed fresh plant material and oil. Preferably, at least 80 wt. %, more preferably at least 90 wt. % and most preferably at least 95 wt. % of the dry matter contained in the processed blend originates from heat processed fresh plant material and oil. The heat processed first and second plant material together typically represent at least 30 wt. %, more preferably at least 50 wt. % of the total amount of heat processed plant material in the processed blend.

According to a preferred embodiment, the fresh plant materials employed in the present process are selected from vegetables, fruit and combinations thereof.

In the present process, the first and second plant material can be the same, provided that such a plant material contains the required levels of lipophilic as well as hydrophilic vitamins. Preferably, the first plant material and the second plant material are different.

The first fresh plant material can suitably be selected from carrot, pumpkin, sweet potatoes, mangoes, squash (winter), kale, Swiss chard, spinach, collards, turnip greens, dandelion greens, Chinese cabbage, bell pepper (red), cantaloupe melon, plum, tangerine, papaya, Romaine lettuce and combinations thereof. According to a particularly preferred embodiment, the first fresh plant material is selected from carrot, pumpkin, sweet potato and combinations thereof.

The second fresh plant material can suitably be selected from broccoli, Romaine lettuce, green pea, Brussels sprout, tomato, acerola berry, orange (navel), pepper (chili), grapefruit (pink & red), pineapple, strawberry, kale, bell pepper, kiwi, sweet corn (yellow), honeydew melon, grape (American) and combinations thereof. More preferably, the second fresh plant material is selected from broccoli, spinach, Romaine lettuce, green peas, tomato and combinations thereof.

Tomatoes are an important source of lycopene. Unlike the carotenoids mentioned herein before, lycopene is not a provitamin. However, like these other carotenoids, lycopene is a nutritionally valuable micronutrient. The inventors have designed a special pre-treatment regime that is particularly suitable for processing tomatoes as it maximizes the lycopene yield in the final product. Hence, in accordance with a particularly preferred embodiment, the present process comprises a third pre-treatment regime for processing tomatoes, said third pre-treatment regime comprising:
- providing fresh tomatoes;
- blanching said tomatoes, optionally after having cut these tomatoes, by heating them for 1-300 seconds to reach an internal temperature of temperature of at least 60° C.;
- blending the blanched tomatoes to produce tomato puree; and
- combining the tomato puree with the lipophilic vitamin containing puree and the hydrophilic vitamin containing mass, preferably prior to the homogenisation.

In a preferred embodiment, seeds and skin are removed from the tomato puree after the blending; said seeds and skin may suitably be removed by e.g. sieving the puree. Following the removal of seeds and skin, this third pre-treatment puree is then combined with the first pre-treatment puree and second pre-treatment mass.

Although the cooking operation in the present process can result in pasteurisation or even sterilization of the first plant material, it is preferred to minimize heat exposure during the cooking and blanching operations described herein before, and to subject the combination of the lipophilic vitamin containing puree and the hydrophilic vitamin containing mass to a final heat pasteurization or heat sterilization. By employing a final heat pasteurization/sterilization step, vitamin losses during the separate processing of the first and second plant materials can be minimized effectively. According to a particularly preferred embodiment of the present process, the combination of the lipophilic vitamin containing puree and the hydrophilic vitamin containing mass is subjected to heat sterilization.

Another aspect of the present invention relates to a method of producing a pasteurized or sterilized edible consumer product, said method comprising a process as defined herein before, wherein the method further comprises combining the processed blend of one or more plant materials with one or more other food ingredients to produce an edible consumer product, followed by pasteurisation or sterilisation of said edible consumer product.

Examples of edible consumer products that may be produced by this method include soups, sauces and beverages.

In the final consumer product that is obtained by the above defined method, the processed blend typically constitutes 5-90 wt. % of the product.

The one or more other food ingredients that are combined with the processed blend in the present method preferably include pieces of the first and/or of the second plant material, said pieces having an average diameter of at least 5 mm. The inclusion of the latter pieces of plant material may improve the appearance, taste and texture of the edible consumer product whilst the processed blend contributes high levels of orally bioavailable vitamins. Typically, the pieces of the first and/or second plant material are combined with the processed blend in a weight ratio of 1:10 to 10:1, more preferably of 1:5 to 5:1. Together, the pieces of the first and second plant material and the processed blend preferably represent 1-95% by weight, more preferably 5-90 wt. % of the final consumer product.

Yet another aspect of the invention relates to a processed blend of two or more plant materials that can be obtained by the process described herein before. In accordance with a particularly preferred embodiment, said blend comprises 0.01-0.2% by weight of dry matter of provitamin A selected from α-carotene, β-carotene, γ-carotene, β-cryptoxanthin and combinations thereof.

In accordance with another advantageous embodiment, at least 40%, more preferably at least 50% of the lipophilic vitamins contained in the blend is bioavailable. Here the percentage of bioavailability of the lipophilic vitamins is determined by measuring the bioavailability for each of the lipophilic vitamins (provitamin A, vitamin E, vitamin K) and averaging the percentages so obtained.

The processed blend obtained by the present process typically contains 75-95 wt. % of water and 5-25 wt. % of dry matter, including 1-10% oil by weight of dry matter.

The invention is further illustrated by means of the following non-limiting examples.

EXAMPLES

Example 1

A soup was prepared on the basis of the recipe shown in Table 1.

TABLE 1

| Ingredient | Wt. % |
|---|---|
| Tomato (no skin or seeds) | 20 |
| Carrot | 20 |
| Broccoli | 20 |
| Water | 29.215 |
| Olive oil | 5.0 |
| Corn starch | 0.15 |
| Sucrose | 1.7 |
| Salt | 0.9 |
| Herbs and spices | 0.635 |
| Lemon juice | 2.4 |
| Total | 100 |

The tomatoes, broccoli and carrots were washed and any blemishes, moulds and injuries were removed, before further processing in accordance with the procedures described below.

Carrot
- Cut off top & tail
- Peel
- Chop in slices of 10 mm×10 mm
- Cook in boiling water for 15 min.
- Drain carrots
- Combine still warm cooked carrots with heated oil (80° C.)
- Blend with hand-held staff-mixer to form thick puree
- Add half of the water and blend further to form smooth puree Broccoli
- Cut off 2-3 cm from base of stalk
- Cut head into large pieces (separate florets with small part of stalk attached)
- Blanch broccoli in microwave, aiming at 85° C. core temperature for 1 min.
- Combine blanched broccoli with lemon juice and rest of the water Blend with hand-held staff-mixer to form thick puree
Tomatoes
  Cut in halves
  Blanch in microwave, aiming at 85° C. core temperature for 1 min.
  Blend until a liquid puree is formed
  Push the pureed tomato through the sieve to extract seeds and skin
  Collect puree
In addition, a starch slurry was produced as follows:
  Prepare a premix of all dry ingredients
  Disperse the premix in cold water with a whisk
  Bring to boil while continuously mixing
  Simmer for 5 minutes
The three processed vegetables and the starch slurry were combined and mixed under low shear. Next, the mixture was homogenized using a single pass at 100 bar. Then, herbs were added and pH was adjusted to 4.2-4.6. The soup so obtained was retort pasteurized.

Example 2

Example 1 was repeated except that this time prior to the addition of the herbs the mixture was homogenized using a single pass at 200 bar.

Example 3

Example 2 was repeated except that this time prior to the addition of the herbs the mixture was homogenized using a single pass at 400 bar.

Example 4

Example 3 was repeated except that this time prior to the addition of the herbs the mixture was homogenized using a single pass at 600 bar.

Comparative Example A

A soup was prepared on the basis of the same recipe as in Example 1 with slight changes that included 2.5 wt. % oil and 31.715 wt. % of water.
Using the procedures described in Example 1, broccoli and carrots were washed and cut into pieces whilst the tomatoes were washed, pureed and sieved without the heating step.
Next, the three pre-processed vegetables were transferred into a cooking pot ¾ of the water was added. The mixture was brought to the boil and simmered for 15 min. A starch slurry, using the remaining water, was prepared from the dry ingredients in the same way as in Example 1 and added to the vegetable mixture. The entire cooked mixture was blended with a held-hand staff-mixer to form a thick puree. Subsequently oil, lemon juice and herbs were blended in. Finally, the pH was adjusted to 4.2-4.6 and the soup was pasteurized as in Example 1.

Example 5

The nutritional status of the soups prepared as described in the preceding Examples was evaluated by determining the nutrient retention and by measuring the in vitro extraction of vitamins in digestive juices. Artificial digestive juices were prepared based on human physiology and added to the soups, mixed and incubated according to physiological pH and transit times. The fraction of vitamins that is released from the food matrix into the aqueous volume (dissolved or solubilised in mixed micelles) of the digestive juices after centrifugation represents the bioaccessible fraction.

The relative in vitro accessibility of a vitamin can be calculated as the in vitro accessible amount over the total amount of that nutrient and expressed as a percentage. Table 2 shows the relative in vitro accessibility of 4 vitamins (5-methyl folate, vitamin C, lycopene and β-carotene) in the 5 soups described in the preceding Examples.

TABLE 2

(relative in vitro accessibility, shown as %)

|  | Example 1 | Example 2 | Example 3 | Example 4 | Example A |
|---|---|---|---|---|---|
| Folate | 37.9 | 45.5 | 94.2 | 45.1 | 38.3 |
| Vitamin C* | 100 | 100 | 100 | 100 | 100 |
| β-Carotene | 62.3 | 45.8 | 55.3 | 42.4 | 55.5 |
| Lycopene | 57.0 | 47.0 | 52.9 | 42.9 | 26.6 |

*vitamin C is assumed to be fully bio-accessible from cooked vegetable matrix

The nutrient retention in each of the soups is depicted in Table 3.

TABLE 3

(nutrient retention, shown as %)

|  | Example 1 | Example 2 | Example 3 | Example 4 | Example A |
|---|---|---|---|---|---|
| Folate | 90.2 | 87.3 | 93.8 | 96.1 | 74.6 |
| Vitamin C | 61.7 | 57.7 | 60.5 | 57.9 | 33.7 |
| β-Carotene | 73.0 | 77.4 | 74.9 | 77.0 | 52.5 |
| Lycopene | 70.0 | 67.1 | 56.1 | 63.7 | 81.4 |

The overall bio-accessibility (retention*relative bio-accessibility is depicted in Table 4.

TABLE 4

(overall bio-accessibility, shown as %)

|  | Example 1 | Example 2 | Example 3 | Example 4 | Example A |
|---|---|---|---|---|---|
| Folate | 34.2 | 39.7 | 88.4 | 43.4 | 28.6 |
| Vitamin C | 61.7 | 57.7 | 60.5 | 57.9 | 33.7 |
| β-Carotene | 45.4 | 35.4 | 41.4 | 32.7 | 29.2 |
| Lycopene | 39.9 | 31.5 | 29.7 | 27.4 | 21.6 |

Comparative Example B

Example A was repeated to study the effect of the oil on the overall bio-accesibility of the lipophilic micronutrients β-carotene and lycopene. Using the procedure described in Example A, a soup A containing 2.5 wt. % oil (and 31.715 wt. % water), and a soup B containing 5 wt. % of oil (and 29.215 wt. % water) was prepared.

The nutritional status of soups A and B was evaluated in the same way as described in Example 5, except that this time the analysis was limited to β-carotene and lycopene. The results so obtained are depicted in the Tables 5 to 7.

TABLE 5

| (relative in vitro accessibility, shown as %) | | |
|---|---|---|
| | Soup A | Soup B |
| β-Carotene | 35.5 | 30.2 |
| Lycopene | 22.3 | 21.7 |

TABLE 6

| (nutrient retention, shown as %) | | |
|---|---|---|
| | Soup A | Soup B |
| β-Carotene | 57.9 | 61.6 |
| Lycopene | 84.5 | 67.1 |

TABLE 7

| (overall bio-accessibility, shown as %) | | |
|---|---|---|
| | Soup A | Soup B |
| β-Carotene | 21.2 | 18.5 |
| Lycopene | 18.9 | 14.1 |

It can be concluded from the above results that the difference in oil content between the two soups has had no significant effect on the overall bio-accessibilty of the lipophilic micronutrients β-carotene and lycopene.

Example 5

The effect of daily intakes of two differently processed soups, on dietary pattern, human carotenoid bioavailability and oxidative status was investigated.

Sixty-nine subjects (35 men and 34 women) participated in the study and consumed during 4 weeks one serving of 300 ml/day of a soup that was prepared in accordance with the present invention or a soup that was prepared using conventional processing (reference).

Production of Soup

The soup according to the invention was prepared on the basis of the recipe described in Example 1, using a process that was very similar to the process described in Example 1, except that:
A. the freshly cut carrot cubes were blanched in a steam chamber to reach an internal temperature of 85° C. for appr. 45 minutes
B. the freshly cut broccoli pieces were blanched in a steam chamber to reach an internal temperature of 85° C. for at least 2 minutes
C. the blanched puree, the blanched broccoli and the tomato puree were packed in sealed bags and temporarily stored at 5° C.
D. after combining of the 4 streams, the mixture was cooled to below 25° C. prior to homogenisation The reference soup was prepared using the recipe and procedure described in Example A except that the same modifications A, B and C were made.

Human Bioavailability Study

Blood samples were collected before and after 4 weeks of soup consumption.

The serum β-carotene response was found to be significantly higher after intake of the soup of the present invention compared with the reference soup (0.41±0.05 vs. 0.24±0.03 μmol/L). Furthermore, it was found that the serum homocysteine response was significantly lower after intake of the soup of the invention as compared with the reference soup (P=0.011).

Serum concentrations of oxidized LDL and antioxidant enzymes (glutathione reductase, superoxide dismutase, glutathione peroxidase) were also significantly lower following intake of the soup of the invention as compared with the reference soup.

In Vitro Study

The antioxidative effect of the two soups was evaluated using a combination of human postprandial chylomicron fractions and a cellular antioxidant activity assay. HepG2 cells were stimulated with the chylomicrons obtained in the postprandial assay after the intake of the two different soups.

The antioxidant effect of postprandial chylomicrons in HepG2 cells was quantified by dichlorofluoresceine (DCFH), a useful indicator of reactive oxygen species and oxidative stress. The postprandial chylomicron fractions collected after consumption of the optimized soup significantly reduced DCFH oxidation in HepG2 cells.

These in vitro results confirmed the beneficial health effects on oxidative stress observed in subjects consuming a soup that was prepared using the process according to the present invention.

The invention claimed is:

1. A process for preparing a processed blend from two or more fresh plant materials, including:
   1) a first fresh plant material containing at least 5 mg/kg of lipophilic vitamin selected from provitamin A, vitamin E, vitamin K and combinations thereof; and
   2) a second fresh plant material containing hydrophilic vitamin selected from at least 1 mg/kg of vitamin B5, at least 1 mg/kg of vitamin B6, at least 200 μg/kg of vitamin B11, at least 100 mg/kg of vitamin C and combinations thereof; said process comprising:
   A. a first pre-treatment regime for increasing the bioavailability of the lipophilic vitamin contained in the first plant material, comprising:
      providing pieces of the first fresh plant material;
      cooking said pieces by heating them to reach an internal temperature of at least 80° C. for at least 2 minutes;
      comminuting the cooked pieces to produce a lipophilic vitamin containing puree; and
   said first pre-treatment regime comprising the addition of 1-50% of oil by weight of the first plant material, said oil being a lipid selected from the group consisting of triglycerides, diglycerides, monaglycerides, phospholipids and combinations thereof; and
   B. a second pre-treatment regime for stabilising the hydrophilic vitamins contained in the second plant material comprising:
      providing pieces of the second fresh plant material; and
      blanching said pieces by heating them for 1-300 seconds to reach an internal temperature of at least 60° C. to produce a hydrophilic vitamin containing mass;
      wherein said blanching comprises microwave heating, contacting with steam, ohmic heating and/or contacting with hot water, said blanching, if employing addition of water, comprising addition of water in an amount of not more than 50% by weight of the second plant material;
   C. combining the lipophilic vitamin containing puree and the hydrophilic vitamin containing mass;
   wherein the lipophilic vitamin containing puree is homogenised at a high pressure of at least 50 bar before or after being combined with the hydrophilic vitamin containing mass.

2. Process according to claim 1, wherein the pieces of the first fresh plant material have a mass weighted average diameter of at least 5 mm and wherein the comminuted cooked pieces have a mass weighted average diameter of less than 500 μm.

3. Process according to claim 1, wherein the second pre-treatment regime comprises comminuting the blanched pieces of the second plant material.

4. Process according to claim 1, wherein the pieces of the second fresh plant material have a mass weighted average diameter of at least 10 mm and wherein the blanched pieces of the second plant material are comminuted, the comminuted blanched pieces so obtained having a mass weighted average diameter of less than 500 μm.

5. Process according to claim 4, wherein the second pre-treatment regime comprises adding an acid aqueous component prior to the comminuting of the blanched pieces of the second plant material, said addition yielding a pH within the range of 3.5-5.5.

6. Process according to claim 1, wherein the cooking of the pieces of the first fresh plant material comprises heating said pieces to a temperature $T_1$ (in ° C.) during a period $t_1$ (in seconds) in accordance with the following equation: $6*10^4*(T_1-75)^{-3} \leq t_1 \leq 5*10^7*(T_1-70)^{-3}$;

wherein $T_1$ is in the range of 80-150° C.

7. Process according to claim 1, wherein the blanching of the pieces of the fresh second plant material comprises heating said pieces to a temperature $T_2$ (in ° C.) during a period $t_2$ (in seconds) in accordance with the following equation: $3*10^4*(T_2-55)^{-3} \leq t_2 \leq 3*10^5*(T_2-60)^{-3}$;

wherein $T_2$ is in the range of 70-105° C.

8. Process according to claim 1, wherein the lipophilic vitamin containing puree and the hydrophilic vitamin containing mass are combined in a weight ratio that lies within the range of 1:10 to 10:1.

9. Process according to claim 1, wherein the first fresh plant material is selected from carrot, pumpkin, sweet potatoes, mangoes, squash (winter), kale, Swiss chard, spinach, collards, turnip greens, dandelion greens, Chinese cabbage, bell pepper (red), cantaloupe melon, plum, tangerine, papaya, Romaine lettuce and combinations thereof.

10. Process according to claim 1, wherein the second fresh plant material is selected from broccoli, Romaine lettuce, green pea, Brussels sprout, tomato, acerola berry, orange (navel), pepper (chili), grapefruit (pink & red), pineapple, strawberry, kale, bell pepper, kiwi, sweet corn (yellow), honeydew melon, grape (American) and combinations thereof.

11. A method of producing a pasteurized or sterilized edible consumer product, said method comprising a process according to claim 1, wherein the method further comprises combining the processed blend of one or more plant materials with one or more other food ingredients to produce an edible consumer product, followed by pasteurisation or sterilisation of said edible consumer product, wherein said edible consumer product is selected from a soup, a sauce and a beverage.

* * * * *